United States Patent
Canchi et al.

(10) Patent No.: US 9,595,280 B2
(45) Date of Patent: Mar. 14, 2017

(54) HARD DISK DRIVE HEAD-DISK INTERFACE DITHERING

(71) Applicant: HGST Netherlands B.V., Amsterdam (NL)

(72) Inventors: Sripathi V Canchi, San Jose, CA (US); Sukumar Rajauria, San Jose, CA (US); James W Reiner, Palo Alto, CA (US); Erhard Schreck, San Jose, CA (US)

(73) Assignee: Western Digital Technologies, Inc, Irvine, CA (US)

( * ) Notice: Subject to any disclaimer, the term of this patent is extended or adjusted under 35 U.S.C. 154(b) by 22 days.

(21) Appl. No.: 14/633,126

(22) Filed: Feb. 26, 2015

(65) Prior Publication Data

US 2016/0254016 A1    Sep. 1, 2016

(51) Int. Cl.
*G11B 5/60* (2006.01)

(52) U.S. Cl.
CPC ............ *G11B 5/6035* (2013.01); *G11B 5/607* (2013.01); *G11B 5/6076* (2013.01)

(58) Field of Classification Search
CPC ..... G11B 5/60–5/6017; G11B 5/6029–5/6035; G11B 5/6058; G11B 5/6076
USPC ......................................... 360/31, 55, 69, 75
See application file for complete search history.

(56) References Cited

U.S. PATENT DOCUMENTS

| | | | | |
|---|---|---|---|---|
| 7,016,139 B2* | 3/2006 | Baumgart | ............ | G11B 5/6005 360/75 |
| 7,199,960 B1* | 4/2007 | Schreck | ............... | G11B 5/6017 360/75 |
| 7,233,451 B2* | 6/2007 | Baumgart | ............ | G11B 5/6005 360/75 |
| 7,405,896 B2* | 7/2008 | Hirano | ................. | G11B 5/6017 360/75 |
| 7,660,068 B1* | 2/2010 | Baumgart | ................ | G11B 5/40 360/75 |
| 7,830,634 B2* | 11/2010 | Chen | ...................... | G11B 27/36 360/75 |
| 8,004,788 B2 | 8/2011 | Ehrlich et al. | | |
| 8,085,490 B2* | 12/2011 | Franca-Neto | ........ | G11B 5/6029 360/75 |
| 8,139,309 B2 | 3/2012 | Knigge et al. | | |
| 8,493,070 B2* | 7/2013 | Komiya | ............... | G11B 19/048 324/519 |
| 8,582,231 B1 | 11/2013 | Kermiche et al. | | |
| 8,593,753 B1 | 11/2013 | Anderson | | |

(Continued)

OTHER PUBLICATIONS

Ryouji Kobayashi et al., HDI Technology for Perpendicular Magnetic Recording Media, Fuji Electric Review, 2011, pp. 51-56, vol. 57 No. 2, Fuji Electric.

*Primary Examiner* — Wayne Young
*Assistant Examiner* — James L Habermehl
(74) *Attorney, Agent, or Firm* — John D. Henkhaus (57) ABSTRACT

A procedure for accurately determining thermal flying height control (TFC) touchdown power associated with a head-disk interface (HDI) in a hard disk drive (HDD) involves dithering the spacing corresponding to the HDI by applying an oscillating signal. The touchdown power with the HDI dithering applied is determined and, based on that and the dithering amplitude, the touchdown power without dithering applied, as well as the back-off power, is determinable.

21 Claims, 3 Drawing Sheets

(56) References Cited

U.S. PATENT DOCUMENTS

| | | | |
|---|---|---|---|
| 8,599,506 B2 | 12/2013 | Contreras et al. | |
| 8,638,349 B1* | 1/2014 | Liu | G11B 5/607 360/75 |
| 8,681,445 B1 | 3/2014 | Kermiche et al. | |
| 8,730,611 B2* | 5/2014 | Liu | G11B 5/6076 360/75 |
| 8,786,977 B2 | 7/2014 | Setiadi et al. | |
| 8,837,070 B1* | 9/2014 | Johnson | G11B 5/6017 360/69 |
| 8,848,309 B2* | 9/2014 | Budde | G11B 5/6076 360/75 |
| 8,970,978 B1* | 3/2015 | Knigge | G11B 5/6076 360/75 |
| 8,995,076 B1* | 3/2015 | Olson | G11B 5/596 360/69 |
| 9,135,938 B2* | 9/2015 | Liu | G11B 5/6076 |
| 9,171,581 B2* | 10/2015 | Lou | G11B 5/4555 |
| 9,245,561 B1* | 1/2016 | Lee | G11B 5/6017 |
| 2008/0158715 A1* | 7/2008 | Hirano | G11B 5/6005 360/75 |
| 2014/0240871 A1 | 8/2014 | Canchi et al. | |

* cited by examiner

HARD DISK DRIVE HEAD-DISK INTERFACE DITHERING

FIELD OF EMBODIMENTS

Embodiments of the invention may relate generally to hard disk drives and more particularly to dithering of the head-disk interface.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the head induces a magnetic field across the gap between the head and the magnetic disk, which in turn magnetizes a small area on the recording medium.

Increasing areal density, a measure of the quantity of information bits that can be stored on a given area of disk surface, is one of the ever-present goals of HDD design evolution. As areal density increases, the read/write head generally needs to fly closer and closer to the disk surface. Flying height control systems are often used to fly the read/write head as close as possible to the magnetic-recording disk for effective operation of the head. Typically, such systems gently urge the head area of the slider toward the disk until contact is made ("touchdown") at which point the slider is urged away from the disk ("back-off"). However, the act of contacting the disk causes mechanical wear of the head which, over time, often leads to operational degradation and eventually failure. Preferably, a touchdown event is sharp, sensitive, repeatable, and gentle so as to avoid wear. Therefore, reliable touchdown and back-off events are critical to the performance of the hard disk drive as it is used to set the critical sub-nanometer clearance air gap between the disk and the head.

Historically, the reduction in overall head-disk interface roughness has been considered important to meeting head-disk spacing goals. Flying instabilities were combated with the innovative use of a thermal flying height control ("TFC") heater in the heads. TFC is utilized to create a slider bulge in the area of the head, and thus reduces the overall area of interaction of the head and disk, and hence the total destabilizing forces arising from atomically smooth surfaces in close proximity. However, as disk and head designers strive to reach even lower roughness in order to meet future head-disk spacing goals, head instabilities at touchdown can manifest even for TFC sliders, which have a very small area of interaction at the head disk interface.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a procedure for determining touchdown power associated with a head-disk interface (HDI) in a hard disk drive (HDD), whereby the spacing corresponding to the HDI is dithered by applying an oscillating signal. The touchdown power with the HDI dithering applied is determined and, based on that, the "true" touchdown power without dithering applied is determined and stored in the HDD. Such a procedure may be executed, for example, during the HDD manufacturing process in order to set the true touchdown power, and/or in the field of operation as the HDI characteristics of an HDD change with use and over time.

Embodiments include various methods of determining the amplitude of the dithering, which may be used to determine the touchdown power without dithering applied. Embodiments also include various ways of applying the oscillating signal to the HDI in order to promote the dithering, such as by applying a voltage between the head and the disk.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a procedure for determining touchdown power associated with a head-disk interface (HDI) in a hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Figure 1:
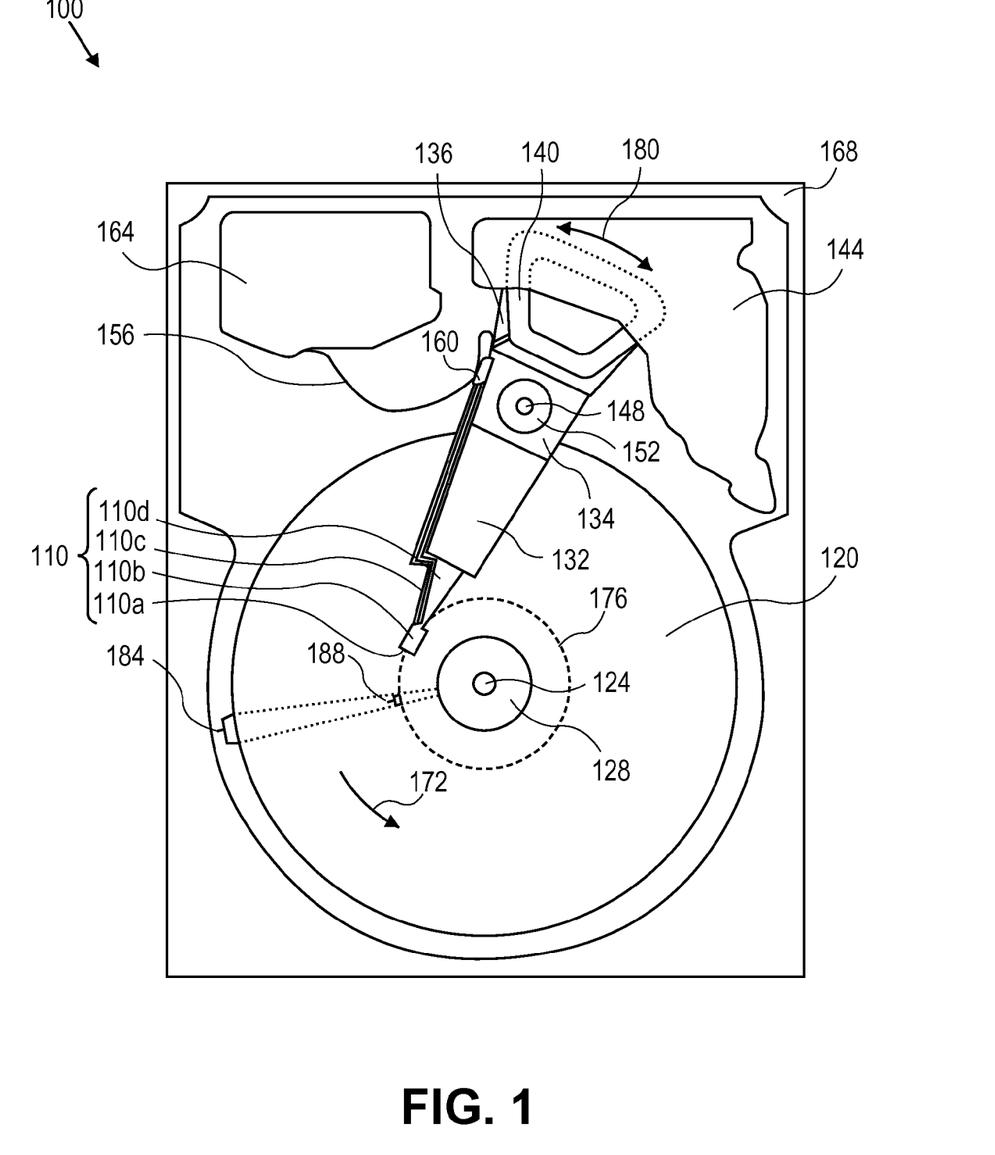
FIG. 1 is a plan view illustrating a hard disk drive, according to an embodiment.

Embodiments may be used for determining touchdown power associated with a head-disk interface in a hard-disk drive (HDD) storage device. Thus, in accordance with an embodiment, a plan view illustrating an HDD 100 is shown in FIG. 1 to illustrate an exemplary operating environment. FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Head instability at low clearance is one of the more challenging problems at the head-disk interface (HDI). The instability is largely attributed to strong short range adhesive and/or attractive forces such as electrostatic, van der Waals and Casimir forces, with additional adhesive contributions associated with disk lubricants. The consequence of such forces may manifest as the head suddenly being pulled toward the disk (sometimes referred to as a "snap-in" event). In the context of a thermal flying height control (TFC) touchdown determination, such a snap-in event can often lead to an incorrect touchdown determination.

Furthermore, subsequent to a snap-in event the head may crash and remain in contact with the disk for an undesirable duration. Such "hysteresis" is an outcome of adhesive interactions at the HDI. For example, if the head snaps in at TFC power P1 and the TFC power is reduced to P2 to snap-out (P2<P1), then this difference P1−P2 is considered the hysteresis amount. Thus, unfavorable hysteresis-prone touchdown typically results in excessive wear of the head and affects overall drive reliability significantly.

The probability of such a foregoing instability depends on different interface parameters, among which smoother (low roughness) disk and head surfaces make a significant contribution. Given that hard disk drives are moving toward extremely smooth disk and head surfaces to meet the head-disk spacing targets, there are likely benefits from improved schemes that can reliably detect touchdown on these low roughness surfaces and accurately set corresponding back-off conditions. As mentioned, reliable touchdown and back-off events are critical to the performance of the hard disk drive as it is used to set the critical sub-nanometer clearance air gap between the disk and the head. Additionally, a mechanism for avoiding and/or overcoming any unwanted snap-in events and associated hysteresis during drive operation is desirable, to provide a way in which to improve the drive reliability.

Dithering the Head-Disk Interface of a Hard Disk Drive

Figure 2:
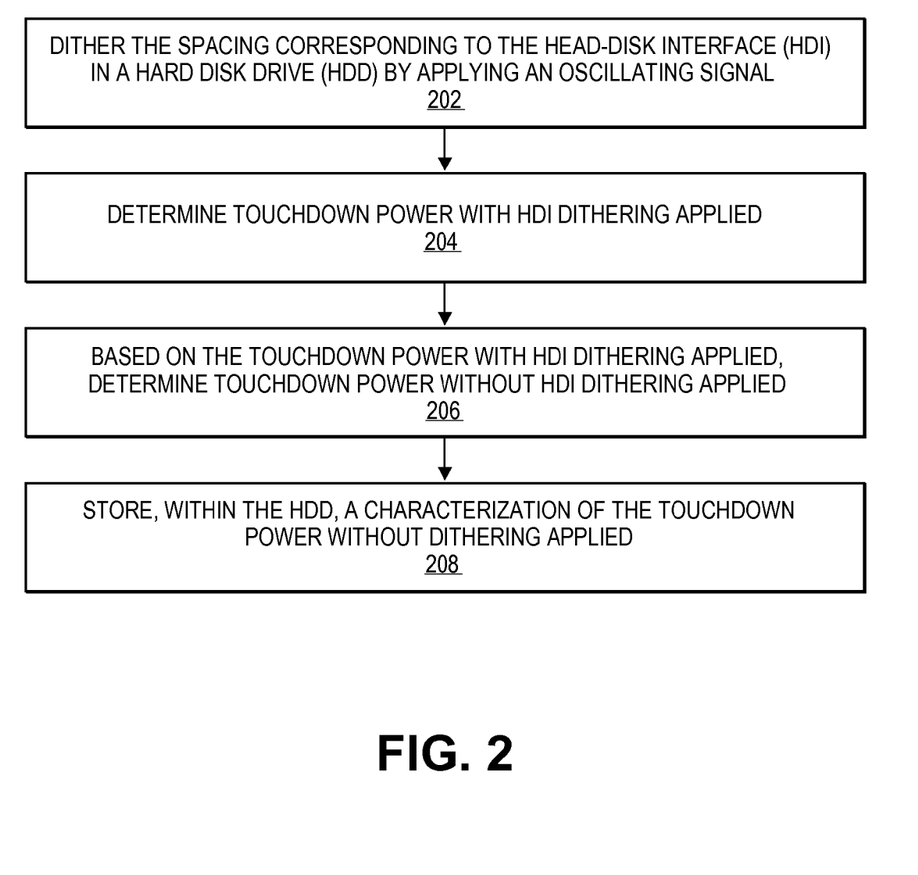
FIG. 2 is a flow diagram illustrating a method for determining touchdown power associated with a head-disk interface in a hard disk drive, according to an embodiment.

FIG. 2 is a flow diagram illustrating a method for determining touchdown power associated with a head-disk interface in a hard disk drive, according to an embodiment. The method depicted in FIG. 2 may be implemented as one or more sequence of instructions, for execution by one or more processor. However, the manner in which the logic is implemented may vary from implementation to implementation. The one or more sequence of instructions may be implemented as firmware stored in ROM or in hardware circuitry, for non-limiting examples. Furthermore, the processing may be implemented for operation in an electronic component, for non-limiting examples, an HDD preamplifier, hard disk controller electronics, read-channel electronics, write-channel electronics, a system-on-a-chip (SOC) integrating one or more of the foregoing, and the like. The manner in which the executing electronics are configured may vary from implementation to implementation. Thus, the memory in which the one or more sequence of instructions is stored, and the one or more processor which executes the instructions, may both reside on a single electronic component, e.g., an integrated circuit board, or may reside on separate electronic components or otherwise separately.

Figure 3:
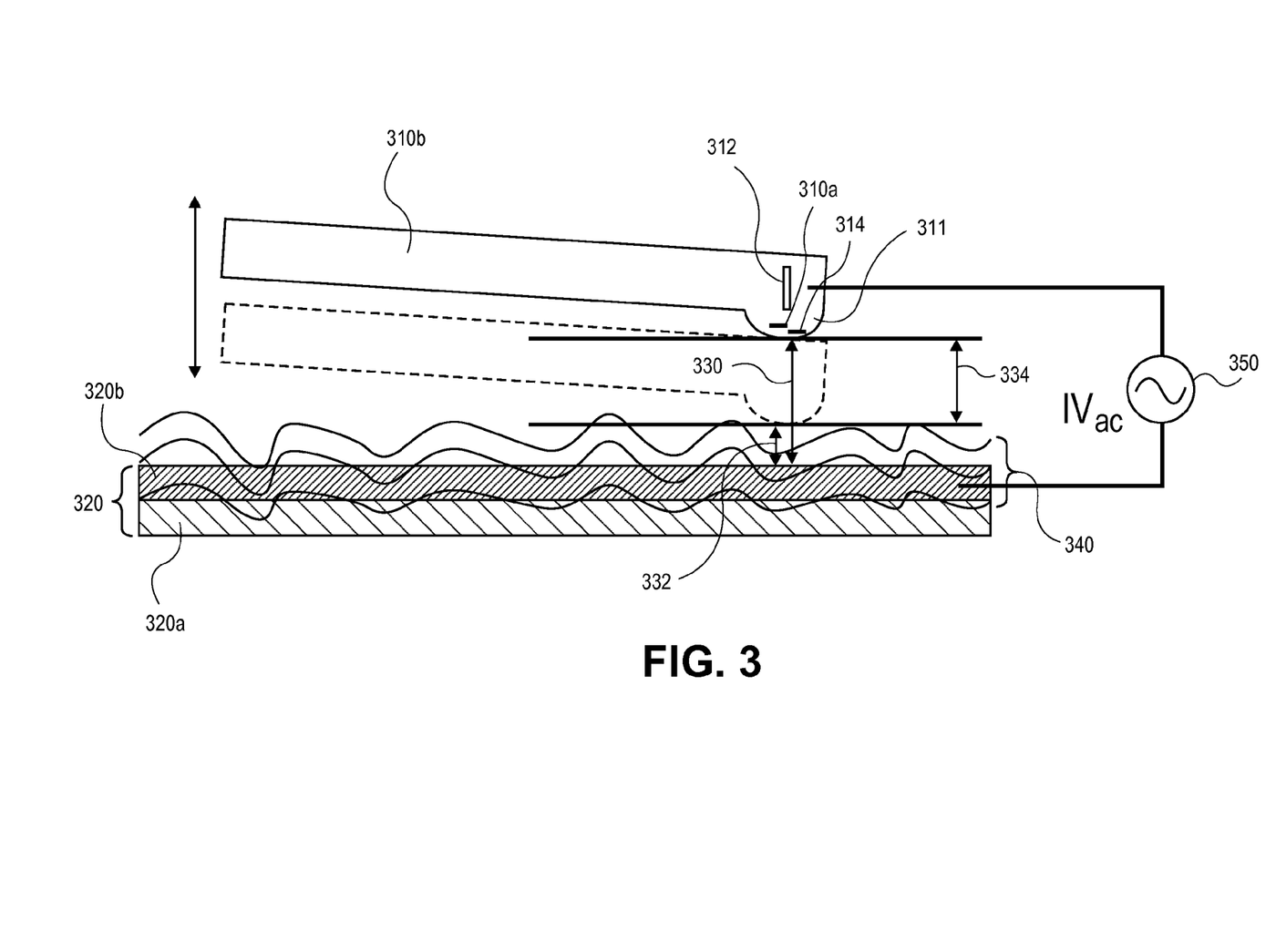
FIG. 3 is a side view schematic illustrating a head-disk interface with an oscillating interfacial signal applied, according to an embodiment.

FIG. 3 is a side view schematic illustrating a head-disk interface with an oscillating interfacial signal applied, according to an embodiment, and is informative in understanding the method of FIG. 2. With reference to FIG. 3, illustrated is an HDI associated with a slider 310b and a disk media 320, where the disk media 320 comprises the primary magnetic recording medium 320a covered with an overcoat 320b, commonly a carbon overcoat. The slider 310b is depicted as having a thermal flying height control (TFC) bulge 311 in the area of the read/write head 310a, which is generated by applying current to a TFC heater 312.

As discussed, TFC systems are used to control the flying height of the read/write head 310a over the disk media 320 at any given time by managing the size of the slider bulge 311 in order to fly the read/write head 310a as close as possible or desirable to the disk media 320 for effective operation of the head. Furthermore, a TFC system needs to be calibrated in order to understand how much power should be applied to the TFC heater 312 in order to achieve the desired flying height. This calibration procedure typically involves the urging of the head area of the slider toward the disk until contact is made ("touchdown"), i.e., by applying power to the TFC heater 312, at which point the slider is urged away from the disk ("back-off") a desired amount corresponding to the desired flying height, by reducing the amount of power applied to the TFC heater 312. The desired flying height with TFC applied is depicted in FIG. 3 as the TFC flying height 330, which has associated touchdown power ("TDP") and back-off power levels.

With reference now to FIG. 2, at block 202 the spacing corresponding to the head-disk interface (HDI) in a hard disk drive (HDD) is dithered, by applying an oscillating signal. For example, dithering of the HDI spacing is invoked simultaneously with performing the regular TFC based touchdown, such as by dithering the slider 310b while performing the TFC touchdown determination procedure. Therefore, the dithering of the HDI disrupts the formation and stability of the attractive and adhesive forces at the interface and, consequently and respectively, a snap-in event is inhibited and any touchdown hysteresis is reduced significantly. Furthermore, dithering the HDI could be used to overcome the adhesive forces associated with a snap-in, i.e., to "snap-out" in the event that a snap-in was to occur.

According to an embodiment, the dithering of head-disk interface at block 202 is achieved by applying an oscillating interfacial voltage signal between the head and disk. For example, while the touchdown is performed using the TFC heater 312, an AC interface voltage (IV) source 350 applies an AC voltage 340 at the HDI (depicted by the wavy lines), i.e., between the slider 310b and the disk media 320, a technique at times referred to as interface voltage control (IVC). How the differential signal is applied to the HDI may vary from implementation to implementation, e.g., a signal could be applied in a certain manner to the slider 310b and/or in a certain manner to the disk media 320.

According to an embodiment, the amplitude of the slider oscillation may be tuned to remove hysteresis, which would be a characteristic phenomenon should dithering not be applied. For example, the hysteresis may be quantified in terms of the amount of TFC power reduction, and thus bulge reduction, that is needed to overcome the hysteresis corresponding to the head-disk contact. Further, the relation between the TFC power (and its correspondence to the hysteresis) and the oscillating interfacial signal (e.g., in terms of voltage) may be used to determine a desired operating point for the oscillating interfacial signal to achieve a desired, or tolerable, amount of head-disk hysteresis.

In light of the foregoing, it can be appreciated that knowledge of the HDI dithering amplitude, also referred to as the slider oscillation amplitude, affects the ability to accurately quantify the excessive adhesion and the TDP and TFC back-off power. Therefore, accurately determining the level of dithering is beneficial. According to an embodiment, the amplitude of the dithering at a given oscillating interfacial signal (e.g., an AC signal) may be calibrated to equivalent TFC power, utilizing an embedded contact sensor (ECS) signal, which is described in more detail elsewhere herein.

Returning to block 202, where the HDI spacing is dithered by applying an oscillating signal, an alternative to applying an interfacial AC voltage 340 at the HDI is to superpose an oscillating component to the TFC power signal, according to an embodiment. Further, according to an embodiment the oscillating frequencies that may be utilized for HDI dithering are in a low frequency range, which is higher than the disk RPM but lower than the slider air bearing surface (ABS) natural frequency, thus avoiding resonance conditions associated with the spindle motor and the slider, respectively. For example and according to an embodiment, the range of frequencies that may be utilized for HDI dithering are between 1 kHz-100 kHz.

With reference to FIG. 2, at block 204 the touchdown power with HDI dithering applied is determined. For example, with TFC active and dithering applied, touchdown occurs at a certain combination of TFC power and oscillating interfacial signal power level. Thus, the amount of power applied to the TFC heater 312 at time of touchdown, for a given oscillating interfacial signal, is determinable.

The touchdown power with dithering applied ("TDP'") is lower than the touchdown power without dithering applied ("TDP"), by an amount equivalent to the dithering amplitude ("DA"). Therefore, at block 206 the touchdown power without HDI dithering applied ("TDP") is determined, based on the touchdown power with dithering applied ("TDP'"). Further, at block 208 a characterization of the touchdown power without dithering applied ("TDP") is stored within the HDD, such as on a user-blocked portion of the disk 320, in ROM or other memory, and the like. Therefore, determination of an accurate TDP value, at which the head slider is substantially free of the likelihood of a snap-in event and of undesirable head-disk contact hysteresis (and associated head wear), enables controller logic to operate the HDD at a desired flying height (without dithering) based on the TDP and associated TFC back-off power increment. Thus, according to an embodiment, a TFC back-off power signal is provided or applied to TFC heater 312 during operation to achieve a particular spacing between the head slider 310b and the disk media 320, i.e., a particular flying height 330.

With further reference to block 206, the touchdown power without HDI dithering applied may be computed based on the following equation:

$$TDP = TDP' + DA \quad (1)$$

where TDP is touchdown power without HDI dithering applied;
  TDP' is touchdown power with HDI dithering applied; and
  DA is the dithering amplitude, also known as the slider oscillation amplitude.

However, even though the amount of power, voltage, current, etc. associated with the oscillating signal applied to the HDI may be known, the actual slider oscillation amplitude ("DA"), i.e., the amount that the slider actually moves up and down, may not be known. Therefore, according to an embodiment, the dithering amplitude ("DA") is determined. According to various embodiments, the dithering amplitude may be determined based on a Wallace spacing loss relationship (which is based on the magnetic read back signal), or the dithering amplitude may be determined based on a signal from an embedded contact sensor (ECS).

Wallace Spacing Loss

The Wallace spacing loss relationship, also referred to as dual harmonic sensing (DHS), is known in the art for its use in flying height measurement. With the Wallace spacing loss relationship, the change in amplitude of the measured readback signal harmonics directly relate to the flying height change of the read/write head/transducer. By calculating the ratio of the fundamental amplitude, Va, and 3rd harmonic amplitude, Vb, the FH is derived from the following expression:

$$\ln V_a/V_b = 4\pi d/\lambda, \quad (2)$$

where: $\lambda$=velocity/write frequency, and
  d=the head-to-disk spacing.

Additional information regarding in-situ measurement of transducer/recording medium clearance is described in U.S. Pat. No. 5,130,866 to Klaassen et al., the content of which is incorporated by reference in its entirety for all purposes as if fully set forth herein.

Embedded Contact Sensor

Resistor temperature detector (RTD) systems are at times used to determine when the slider makes physical contact with the magnetic-recording disk based upon the temperature of an element, such as an embedded contact sensor (ECS), embedded in the slider near the read/write head. ECS elements sense physical contact of the slider with the disk based on the ECS element's resistance, e.g., the amount of voltage across the element, which is affected by the temperature change caused by such physical contact.

With reference to FIG. 3, according to an embodiment embedded contact sensor (ECS) 314 comprises a metallic strip located at the slider 310b air-bearing surface (ABS) and typically in close proximity to the read/write head 310a. The resistance of the ECS changes in response to temperature changes and can be used to determine touchdown, when the slider 310b temperature suddenly increases due to frictional heating with the disk 320.

Additionally, an ECS can be used to sense flying height variations and for continuous flying height monitoring. One non-limiting approach to the use of ECS signals for flying height monitoring is described in U.S. Pat. No. 8,824,091 ("the '091 patent") entitled "Media Topography Driven Flying Height Modulation Sensing Using Embedded Contact Sensor", the entire contents of which is incorporated by reference for all purposes as if fully set forth herein. The '091 patent describes utilization of an ECS to sense flying height variations and for continuous flying height monitoring at the HDD level, by characterizing the media topography at various flying heights. Thus, this disk topography data can be used for awareness of the flying height in view of the current ECS value, and is non-destructive in that the slider need not experience repeated touchdowns with the disk.

Relationships between measured ECS values as a function of TFC current are determinable, and because the TDP value corresponds with a TFC current value, monitored ECS values can be expressed in units of TDP. Therefore, with the use of ECS signals/values to determine the dithering amplitude, the dithering amplitude can also be expressed in terms of units of TDP (e.g., mW), in furtherance of equation (1) above. For example, the ECS signal can be characterized as a function of the oscillating signal, and thus the ECS signal amplitude can be converted into TFC (and likewise TDP) power units.

To convert the ECS signal to head/disk clearance, one may perform a touchdown, and then obtain the ECS signal at different head/disk clearances as the power applied to the TFC heater 312 reduces. However, since the ECS 314 is a heat sensor, the ECS signal change is dominated by the change in the power applied to the TFC heater 312, instead of by the change in the head/disk clearance.

One non-limiting approach to calibrating the ECS 314 independent of the power applied to the TFC heater 312 is described in U.S. patent application Ser. No. 14/058,686 filed on Oct. 21, 2013 and entitled "Method To Convert And Calibrate The Embedded Contact Sensor Signal To Clearance And Spacing Information Using Interface Voltage Control" ("the '686 application"), the entire contents of which is incorporated by reference for all purposes as if fully set forth herein.

The '686 application describes a process in which a plurality of interface voltages to bias the slider (e.g., slider 310b of FIG. 3) relative to the magnetic disk (e.g., disk 320 of FIG. 3) are applied. The interface voltages applied cause a coulomb attraction and affect the spacing between the magnetic head (e.g., read/write head 310a of FIG. 3) and the disk. The plurality of interface voltages may cause a plurality of changes in the head/disk clearance. The interface voltages may be applied to the disk or to the magnetic head, and may have a range between −1 V to 1 V, for example. Next, the change in head/disk clearance for each interface voltage applied to the disk is calculated. The calculation may be based on any suitable technique, such as techniques based on Wallace Spacing Loss relationship.

A relationship between the change in head/disk clearance and the interface voltage is calculated, where for each data point the power applied to the TFC element (e.g., TFC heater 312 of FIG. 3) is kept constant because the relationship between the change in head/disk clearance and the interface voltage applied to the disk may change if the power applied to the TFC element changes. An ECS signal at each interface voltage is obtained. The ECS signals may be obtained by any suitable electronics/preamp that is onboard the disk drive (e.g., HDD 100 of FIG. 1). A relationship between ECS signal and the interface voltage is then calculated.

After calculating the relation between the change in head/disk clearance and the interface voltage and the relationship between the ECS signal and the interface voltage, the relationship between ECS signal and change in head/disk clearance may be calculated.

To reiterate, determination of accurate TDP and back-off power values enables controller logic to operate the HDD at a desired flying height (without dithering) based on the TDP and associated TFC back-off power increment. The determination of an accurate TDP value may be furthered by use of head-disk interface (HDI) dithering techniques described herein, which contribute to an HDI spacing at which the head slider is substantially free of the likelihood of a snap-in event and of undesirable head-disk contact hysteresis.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for determining touchdown power associated with a head-disk interface (HDI) in a hard disk drive (HDD), the method comprising:
   dithering the spacing corresponding to said HDI by applying an oscillating signal;
   determining touchdown power with HDI dithering applied;
   based on said touchdown power with HDI dithering applied, determining touchdown power without HDI dithering applied; and
   storing, within said HDD, a characterization of said touchdown power without dithering applied.

2. The method of claim 1, wherein determining said touchdown power without HDI dithering applied includes determining based on the amplitude of said dithering.

3. The method of claim 2, wherein determining said touchdown power without HDI dithering includes computing the sum of said touchdown power with HDI dithering applied and said amplitude of said dithering.

4. The method of claim 1, further comprising:
   determining the amplitude of said dithering.

5. The method of claim 4, wherein determining the amplitude of said dithering includes determining based on a signal from an embedded contact sensor (ECS).

6. The method of claim 4, wherein determining the amplitude of said dithering includes determining based on a Wallace spacing loss relationship.

7. The method of claim 1, wherein applying said oscillating signal includes applying a voltage between a head and a disk associated with said HDI.

8. The method of claim 1, wherein applying said oscillating signal includes applying an oscillating component to a power signal for a thermal flying height control (TFC) heater element.

9. The method of claim 1, wherein applying said oscillating signal includes applying said signal in a frequency range between the revolutions per minute (RPM) of said disk and the natural frequency of an air bearing surface of a slider on which a head associated with said HDI is mounted.

10. The method of claim 1, wherein applying said oscillating signal includes applying said signal in a frequency range between 1 kHz-100 kHz.

11. A hard disk drive (HDD) comprising:
   a disk medium rotatably mounted on a spindle;
   a head slider comprising a read/write head configured to read from and to write to said disk medium;
   a voice coil actuator configured to move said head slider to access portions of said disk medium; and
   a least one electronic component comprising one or more sequences of instructions which, when executed by one or more processors, cause performance of:
      dithering the spacing between said head slider and said disk medium by applying an oscillating signal;

determining touchdown power with head-disk interface (HDI) dithering applied;

based on said touchdown power with HDI dithering applied, determining touchdown power without HDI dithering applied;

storing, within said HDD, a characterization of said touchdown power without dithering applied; and providing a back-off power signal to a thermal flying height control (TFC) heater element to achieve a particular spacing between said head slider and said disk medium.

12. The hard disk drive of claim 11, said one or more sequences of instructions further causing performance of:

determining the amplitude of said dithering.

13. The hard disk drive of claim 12, wherein determining said touchdown power without HDI dithering includes computing the sum of said touchdown power with HDI dithering applied and said amplitude of said dithering.

14. The hard disk drive of claim 12, wherein determining the amplitude of said dithering includes determining based on a signal from an embedded contact sensor (ECS) or on a Wallace spacing loss relationship.

15. The hard disk drive of claim 11, wherein applying said oscillating signal includes applying a voltage between said head and said disk medium.

16. The hard disk drive of claim 11, wherein applying said oscillating signal includes applying an oscillating component to a power signal for a thermal flying height control (TFC) heater element.

17. The hard disk drive of claim 11, wherein applying said oscillating signal includes applying said signal in a frequency range between the revolutions per minute (RPM) of said disk medium and the natural frequency of an air bearing surface of a slider on which said head is mounted.

18. An electronic component manufacture comprising one or more sequences of instructions which, when executed by one or more processors, cause performance of:

dithering the spacing between a head slider and a disk medium by applying an oscillating signal;

determining touchdown power with head-disk interface (HDI) dithering applied; and based on said touchdown power with HDI dithering applied, determining touchdown power without HDI dithering applied.

19. The electronic component manufacture of claim 18, said one or more sequences of instructions further causing performance of:

determining the amplitude of said dithering; and wherein determining said touchdown power without HDI dithering includes computing the sum of said touchdown power with HDI dithering applied and said amplitude of said dithering.

20. The electronic component manufacture of claim 18, wherein applying said oscillating signal includes applying a voltage between said head slider and said disk medium.

21. The electronic component manufacture of claim 18, wherein applying said oscillating signal includes applying said signal in a frequency range between the revolutions per minute (RPM) of said disk medium and the natural frequency of an air bearing surface of said head slider.

* * * * *